United States Patent
Zheng et al.

(10) Patent No.: US 12,245,075 B2
(45) Date of Patent: Mar. 4, 2025

(54) METHOD FOR SIDELINK DATA DUPLICATION FUNCTION CONTROL, METHOD FOR INFORMATION CONFIGURATION, AND DEVICE

(71) Applicant: VIVO MOBILE COMMUNICATION CO., LTD., Guangdong (CN)

(72) Inventors: Qian Zheng, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 458 days.

(21) Appl. No.: 17/580,407

(22) Filed: Jan. 20, 2022

(65) Prior Publication Data
US 2022/0150755 A1   May 12, 2022

Related U.S. Application Data

(63) Continuation of application No. PCT/CN2020/104024, filed on Jul. 24, 2020.

(30) Foreign Application Priority Data

Jul. 24, 2019   (CN) .......................... 201910673787.0

(51) Int. Cl.
  H04W 28/06  (2009.01)
  H04W 28/02  (2009.01)

(52) U.S. Cl.
  CPC ....... *H04W 28/06* (2013.01); *H04W 28/0252* (2013.01); *H04W 28/0268* (2013.01)

(58) Field of Classification Search
  CPC ............. H04W 28/06; H04W 28/0252; H04W 28/0268; H04W 76/12; H04W 80/02; H04W 76/14; H04W 76/15; H04W 24/02
  (Continued)

(56) References Cited

U.S. PATENT DOCUMENTS

2018/0332501 A1   11/2018   Tseng et al.
2019/0098640 A1    3/2019   Holakouei et al.
(Continued)

FOREIGN PATENT DOCUMENTS

CN   103379529 A   * 10/2013
CN   109429555 A     3/2019
(Continued)

OTHER PUBLICATIONS

Discussion on L2 protocol design for NR sidelink, 3GPP TSG-RAN WG2#103bis, Oct. 8-12, 2018, R2-18, Huawei, HiSilicon, Chengdu, China.
(Continued)

*Primary Examiner* — Rownak Islam
(74) *Attorney, Agent, or Firm* — IP & T GROUP LLP

(57) ABSTRACT

A method for sidelink data duplication function control includes: receiving, by a first terminal device from a higher layer, one or more data flows to be sent to a second terminal device, where a receiving device of the data flows is the second terminal device; and controlling, based on a preset rule, data duplication function of a SLRB between the first terminal device and the second terminal device, where the preset rule includes whether at least one of the data flows satisfies a preset QoS condition, and/or whether at least one communication link between the first terminal device and the second terminal device satisfies a preset link condition.

20 Claims, 3 Drawing Sheets

(58) Field of Classification Search
USPC .......................................................... 370/216
See application file for complete search history.

(56) References Cited

U.S. PATENT DOCUMENTS

| | | | |
|---|---|---|---|
| 2019/0215685 A1* | 7/2019 | Wang | H04W 4/40 |
| 2019/0254062 A1* | 8/2019 | Wu | H04W 76/14 |
| 2020/0296619 A1* | 9/2020 | Pan | H04W 76/14 |
| 2020/0403731 A1* | 12/2020 | Zhang | H04W 76/14 |

FOREIGN PATENT DOCUMENTS

| | | |
|---|---|---|
| CN | 109661833 A | 4/2019 |
| CN | 109952806 A | 6/2019 |

OTHER PUBLICATIONS

Packet Duplication for eV2X Sidelink CA, 3GPP TSG-RAN WG2 #100, 27th Nov.- Dec. 1, 2017, R2-1712970, Potevio, Reno, USA.
Discussion on PPPR report in SidelinkUEInformation, 3GPP TSG-RAN WG2 Meeting #102, May 21-25, 2018, R2-1806751, ZTE, Busan, Korea.
The First Office Action of Priority Application No. CN 201910673787.0 issued by the Chinese Patent Office on May 24, 2021.
The Second Office Action of Priority Application No. CN 201910673787.0 issued by the Chinese Patent Office on Oct. 14, 2021.
International Search Report and Written Opinion of Priority Application No. PCT/CN2020/104024 issued by the Chinese Patent Office on Oct. 27, 2020.
Extended European Search Report for the European Patent Application No. 20843955.4 issued by the European Patent Office on Aug. 22, 2022.
LG Electronics, TS 23.287 Clarification on PC5 QoS rule, 3GPP SA WG2 Meeting #134, S2-1908215, Jun. 24 to Jun. 28, 2019, Sapporo, Japan.
Examination Report of Priority Indian Patent Application No. 202217008261 issued by India Intellectual Property on May 17, 2022.
Office Action for the European Patent Application No. 20843955.4 issued by the European Patent Office on Oct. 11, 2024.
Qualcomm Incorporated, Analysis of URLLC solutions using DC, 3GPP Draft; S2-1811944-ANALYSIS of URLLC DC Architectures-R1, Nov. 20, 2018, pp. 1-18, vol. SA WG2, West Palm Beach, FL, USA.

* cited by examiner

Transmit target information to a first terminal device, where the target information is used for configuring a target condition for the first terminal device, the target condition includes at least one of a preset quality of service QoS condition and a preset link condition, and the target condition is used for the first terminal device to control data duplication of a sidelink radio bearer SLRB between the first terminal device and a second terminal device ⎯S301

FIG. 3

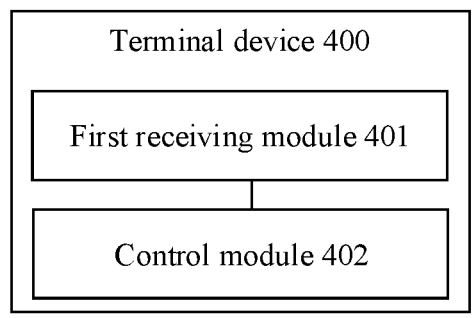

FIG. 4

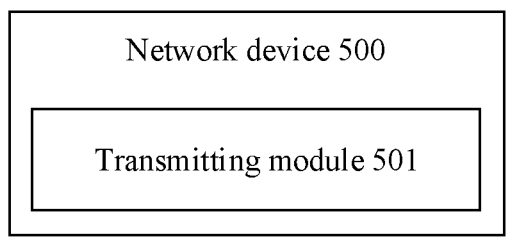

FIG. 5

METHOD FOR SIDELINK DATA DUPLICATION FUNCTION CONTROL, METHOD FOR INFORMATION CONFIGURATION, AND DEVICE

CROSS-REFERENCE TO RELATED APPLICATIONS

This application is a Bypass Continuation Application of PCT/CN2020/104024, filed on Jul. 24, 2020, which claims priority to Chinese Patent Application No. 201910673787.0, filed on Jul. 24, 2019, which are incorporated herein by reference in their entirety.

TECHNICAL FIELD

This disclosure pertains to the field of communications technologies, and specifically, relates to a method for sidelink data duplication function control, a method for information configuration, and a device.

BACKGROUND

In a wireless communications system, in order to further improve data transmission reliability and/or reduce data transmission latency, data duplication function (duplication), for example, packet data convergence protocol (PDCP) data duplication function, is introduced to the terminal device (also named user equipment (UE)) side. PDCP data duplication function refers to a technology of duplicating data of a PDCP entity and transmitting the duplicated data through a plurality of (two or more) different paths, for example, transmitting the duplicated data through a plurality of radio link control (RLC) entities, where different RLC entities correspond to different logical channels.

SUMMARY

Embodiments of this application provide a method for sidelink data duplication function control, a method for information configuration, and a device.

A first aspect of this disclosure provides a method for sidelink data duplication function control, applied to a first terminal device and including:
  receiving, from a higher layer, one or more data flows to be sent to a second terminal device; and
  controlling, based on a preset rule, data duplication function of a sidelink radio bearer (SLRB) between the first terminal device and the second terminal device, where the preset rule includes whether at least one of the data flows satisfies a preset quality of service (QoS) condition, and/or whether at least one communication link between the first terminal device and the second terminal device satisfies a preset link condition.

A second aspect of this disclosure provides a method for information configuration, applied to a network device and including:
  transmitting target information to a first terminal device; where
  the target information is used for configuring a target condition for the first terminal device, the target condition includes at least one of a preset QoS condition or a preset link condition, and the target condition is used for the first terminal device to control data duplication function of a SLRB between the first terminal device and a second terminal device.

A third aspect of this disclosure provides a first terminal device, including:
  a first receiving module, configured to receive, from a higher layer, one or more data flows to be sent to a second terminal device; and
  a control module, configured to control, based on a preset rule, data duplication function of a SLRB between the first terminal device and the second terminal device, where the preset rule includes whether at least one of the data flows satisfies a preset QoS condition, and/or whether at least one communication link between the first terminal device and the second terminal device satisfies a preset link condition.

A fourth aspect of this disclosure provides a network device, including:
  a transmitting module, configured to transmit target information to a first terminal device, where
  the target information is used for configuring a target condition for the first terminal device, the target condition includes at least one of a preset QoS condition or a preset link condition, and the target condition is used for the first terminal device to control data duplication function of a SLRB between the first terminal device and a second terminal device.

A fifth aspect of this disclosure provides a terminal device, where the terminal device includes a memory, a processor, and a wireless communication program stored in the memory and executable on the processor, and when the wireless communication program is executed by the processor, the steps of the method according to the first aspect are implemented.

A sixth aspect of this disclosure provides a network device, where the network device includes a memory, a processor, and a wireless communication program stored in the memory and executable on the processor, and when the wireless communication program is executed by the processor, the steps of the method according to the second aspect are implemented.

A seventh aspect of this disclosure provides a non-transitory computer-readable storage medium, where a wireless communication program is stored in the non-transitory computer-readable storage medium, and when the wireless communication program is executed by a processor, the steps of the method according to the first aspect or the second aspect are implemented.

BRIEF DESCRIPTION OF DRAWINGS

To describe the technical solutions in the embodiments of this disclosure or in the prior art more clearly, the following briefly describes the accompanying drawings required for describing the embodiments or the prior art. Apparently, the accompanying drawings in the following description show merely some embodiments recorded in this disclosure, and a person of ordinary skill in the art may still derive other drawings from these accompanying drawings.

FIG. 3 is a schematic flowchart of a method for information configuration according to an embodiment of this disclosure;

FIG. 4 is a schematic structural diagram of a terminal device 400 according to an embodiment of this disclosure;

FIG. 5 is a schematic structural diagram of a network device 500 according to an embodiment of this disclosure;

DESCRIPTION OF EMBODIMENTS

Figure 1:
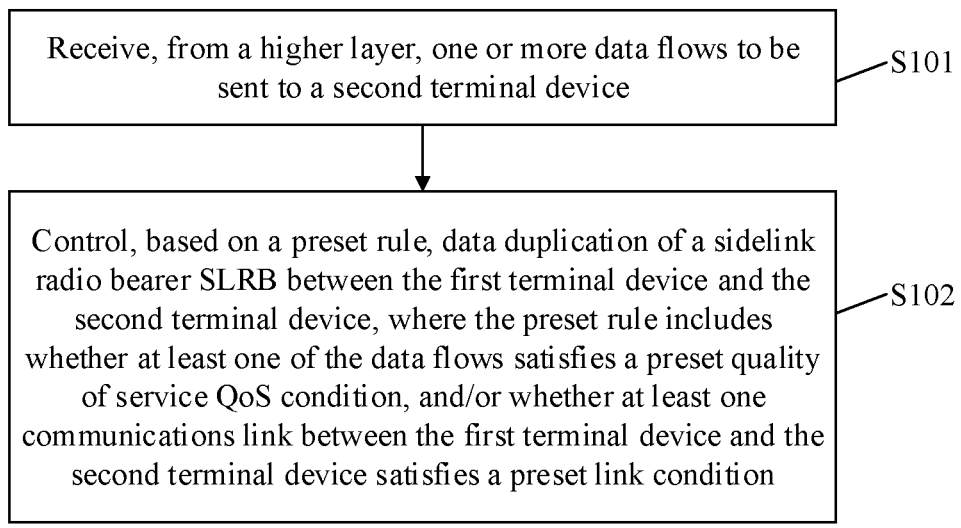
FIG. 1 is a schematic flowchart of a method for sidelink data duplication function control according to an embodiment of this disclosure.

To make a person skilled in the art understand the technical solutions in this disclosure better, the following clearly describes the technical solutions in the embodiments of this disclosure with reference to the accompanying drawings in the embodiments of this disclosure. Apparently, the described embodiments are merely some but not all of the embodiments of this disclosure. All other embodiments obtained by a person of ordinary skill in the art based on the embodiments of this disclosure shall fall within the protection scope of this disclosure.

It should be understood that the technical solutions in the embodiments of this disclosure may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, or a 5G system also known as a new radio (NR) system.

A terminal device (UE) is also referred to as a mobile terminal, a mobile terminal device, and the like, and may communicate with at least one core network through a radio access network (RAN). The terminal device may be a mobile terminal, for example, a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for information configuration. The network device may be a base station, and the base station may be a base transceiver station (BTS) in GSM or CDMA, may be a NodeB in WCDMA, or may be an evolved NodeB (eNB or e-NodeB) or a 5G NodeB (gNB) in LTE, or a network-side device in a later evolved communications system. However, the terms used do not constitute any limitation on the protection scope of this disclosure.

It should be noted that in the description of embodiments, sequence numbers of processes do not mean the order of execution and should not be construed as any limitation on the implementation processes in the embodiments of this disclosure, and the order of execution of the processes should depend on their functions and internal logic.

Sidelink (SL) is used for direct communication between UEs without a network device.

In the related art, for sidelink in a long term evolution (LTE) system, QoS modeling adopts a mechanism of guaranteeing QoS per packet (per packet). When data packets from an application layer are received by UE, each data packet is associated with a PPPP value and a PPPR value, and sent to an access stratum (AS) layer for transmission, where the PPPP value represents a priority and latency requirement for the data packet, and the PPPR value represents a reliability requirement for the data packet. Accordingly, in LTE sidelink, activation (ON) or deactivation (OFF) of sidelink packet duplication is controlled by using a PPPR threshold. Optionally, if the PPPR value of the data packet sent to the AS layer is less than the PPPR threshold, packet duplication is activated to perform a packet duplication operation. Otherwise, packet duplication is not activated and no data packet duplication operation is performed.

In the related art, for sidelink in a new radio (NR) system, QoS modeling adopts a mechanism of guaranteeing QoS per flow. When data packets from an application layer are received by UE, each data flow is associated with a PFI (PC5 QoS flow identifier) value, and sent to an AS layer for transmission, where the PFI value represents a QoS parameter requirement for the data flow.

However, since the activation or deactivation solution for LTE sidelink data duplication function considers only a reliability factor (the PPPR value) in QoS, transmission stability after data duplication function is activated is not ideal. In addition, because the QoS modeling mechanism of NR sidelink has changed relative to LTE sidelink, the activation or deactivation solution for LTE sidelink data duplication function is not applicable to NR sidelink.

The following first describes a method for sidelink data duplication function control according to an embodiment of this disclosure. As shown in FIG. 1, the method for sidelink data duplication function control according to this embodiment of this disclosure may be applied to a first terminal device. The method may include step 101 and step 102.

In step 101, one or more data flows to be sent to a second terminal device are received from a higher layer.

The higher layer refers to one of layers (higher layers) above an access (AS) layer, including a V2X layer and/or an application layer. The second terminal device is one or more terminal devices other than the first terminal device.

In step 102, data duplication function (duplication) of a SLRB between the first terminal device and the second terminal device is controlled based on a preset rule, where the preset rule includes whether at least one of the data flows satisfies a preset QoS condition, and/or whether at least one communication link between the first terminal device and the second terminal device satisfies a preset link condition.

SLRB stands for sidelink radio bearer (SLRB).

The at least one communication link between the first terminal device and the second terminal device includes at least one of a unicast link, a multicast link, or a broadcast link. For ease of description, in the embodiments of this specification, only a unicast link is used as an example to introduce the process of controlling data duplication function of the SLRB between the first terminal device and the second device based on the preset rule.

Figure 2:
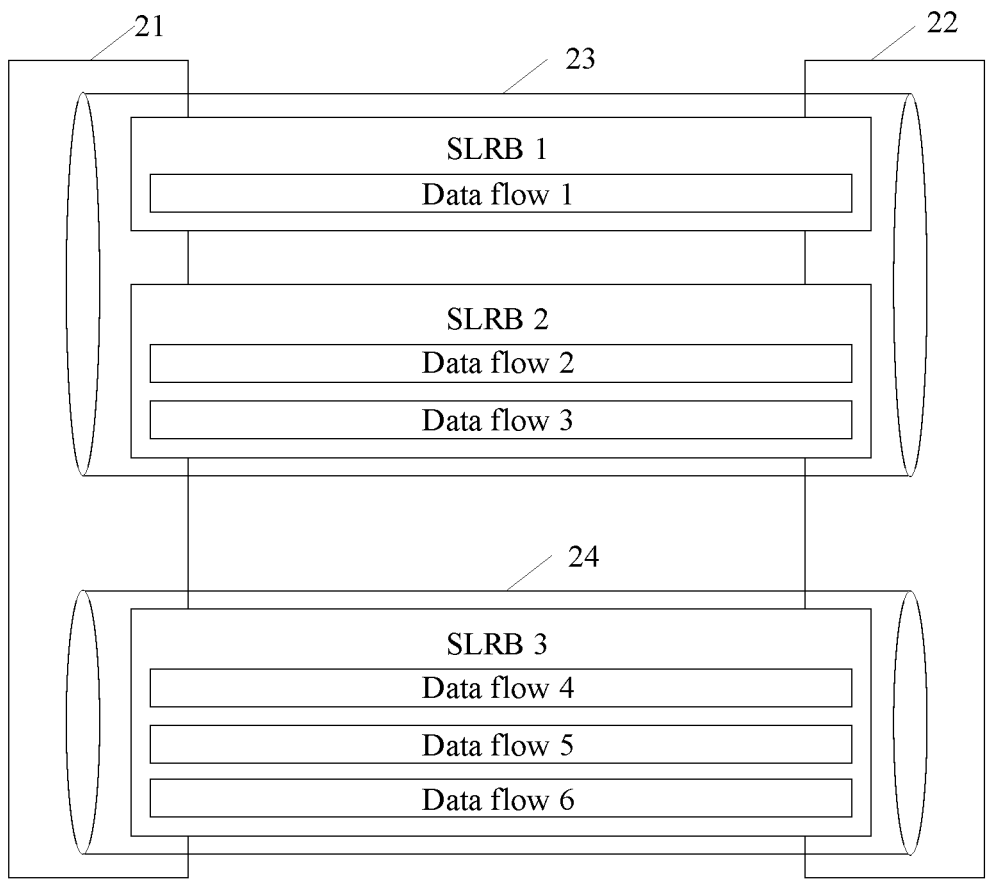
FIG. 2 is a schematic diagram of a sidelink according to an embodiment of this disclosure.

For example, as shown in FIG. 2, a first unicast link 23 and a second unicast link 24 are established between a first terminal device 21 and a second terminal device 22. The first terminal device 21 receives, in step 101, a data flow (QoS flow) 1, a data flow 2, a data flow 3, a data flow 4, a data flow 5, and a data flow 6. Services mapped to the first unicast link 23 are the data flow 1, the data flow 2, and the data flow 3. Optionally, the data flow 1 is mapped to SLRB 1 on the first unicast link 23, and the data flow 2 and the data flow 3 are mapped to SLRB 2 on the first unicast link 23. Services mapped to the second unicast link 24 are the data flow 4, the data flow 5, and the data flow 6. The data flow 4, the data flow 5, and the data flow 6 are all mapped to SLRB 3 on the second unicast link 24. In the following when a specific solution is introduced, the example shown in FIG. 2 is also used for description, and content introduced here will not be described repeatedly but directly referenced instead.

In this embodiment of this application, the preset QoS condition may include but is not limited to at least one of the following conditions:
- a reliability requirement (for example, packet loss rate (PLR) or packet error rate (PER)) of a data flow being higher than a first preset threshold;
- a latency requirement (for example, packet delay budget (PDB)) of a data flow being lower than a second preset threshold;
- a maximum data burst volume (MDBV) of a data flow being higher than a third preset threshold;
- a priority of a data flow being higher than a fourth preset threshold;
- a PC5 QoS flow identifier (PFI) value of a data flow being in a preset PFI list; or
- a PC5 QoS identifier (PQI) value of a data flow being in a preset PQI list.

In this embodiment of this application, the preset link condition includes but is not limited to at least one of the following conditions:
- a reference signal received power (RSRP) being higher than a fifth preset threshold; or no radio link failure (RLF) being detected.

The following describes in detail, by using several examples, the process of controlling data duplication function of the SLRB between the first terminal device and the second terminal device in step 102.

First Example

The preset rule includes whether at least one of the data flows satisfies the preset QoS condition, and the controlling, based on a preset rule, data duplication function of an SLRB between the first terminal device and the second terminal device in step 102 includes:
- controlling data duplication function between the first terminal device and the second terminal device based on the preset rule and a control granularity of SLRB data duplication function, where
- the control granularity is one of flow level (per flow granularity), SLRB level (per SLRB granularity), link level (per link granularity), and terminal device level (per UE granularity).

Optionally, in the first example, before step 102, the method shown in FIG. 1 may further include:
- receiving the preset QoS condition configured by a network device; or
- preconfiguring the preset QoS condition.

In other words, in this embodiment of this disclosure, the preset QoS condition may be preconfigured by a network device or may be preconfigured by the first terminal device itself.

On this basis, the foregoing step of controlling data duplication function between the first terminal device and the second terminal device based on the preset rule and a control granularity of SLRB data duplication function at least may include the following four example embodiments. The following describes these embodiments with reference to FIG. 2.

In an embodiment, the control granularity of SLRB data duplication function is flow level (per flow granularity), and the controlling data duplication function of the SLRB between the first terminal device and the second terminal device based on the preset rule and a control granularity of SLRB data duplication function includes:

in a case that at least one of data flows mapped to a target SLRB satisfies the preset QoS condition, activating data duplication function of the target SLRB, where the target SLRB includes one or more SLRBs between the first terminal device and the second terminal device.

For example, as shown in FIG. 2, in a case that the data flow 1 mapped to SLRB 1 satisfies the preset QoS condition, data duplication function (data duplication) of SLRB 1 is activated; in a case that at least one of the data flow 2 or the data flow 3 that are mapped to SLRB 2 satisfies the preset QoS condition, data duplication function of SLRB 2 is activated; and in a case that at least one of the data flow 4, the data flow 5, or the data flow 6 that are mapped to SLRB 3 satisfies the preset QoS condition, data duplication function of SLRB 3 is activated. Other cases can be derived by analogy.

In another embodiment, the control granularity of SLRB data duplication function is SLRB level (per SLRB granularity), and the controlling data duplication function of the SLRB between the first terminal device and the second terminal device based on the preset rule and a control granularity of SLRB data duplication function includes:

in a case that all of data flows mapped to a target SLRB satisfy the preset QoS condition, activating data duplication function of the target SLRB, where the target SLRB includes one or more SLRBs between the first terminal device and the second terminal device.

For example, as shown in FIG. 2, in a case that the data flow 1 mapped to SLRB 1 satisfies the preset QoS condition, data duplication function of SLRB 1 is activated; in a case that the data flow 2 and the data flow 3 that are mapped to SLRB 2 both satisfy the preset QoS condition, data duplication function of SLRB 2 is activated; and in a case that the data flow 4, the data flow 5, and the data flow 6 that are mapped to SLRB 3 all satisfy the preset QoS condition, data duplication function of SLRB 3 is activated. Other cases can be derived by analogy.

In another embodiment, the control granularity of SLRB data duplication function is link level (per link granularity), and the controlling data duplication function of the SLRB between the first terminal device and the second terminal device based on the preset rule and a control granularity of SLRB data duplication function includes:
- in a case that all of data flows mapped to a target communication link satisfy the preset QoS condition, activating data duplication function of all SLRBs on the target communication link, where the target communication link includes one or more communication links between the first terminal device and the second terminal device.

For example, as shown in FIG. 2, in a case that the data flow 1, the data flow 2, and the data flow 3 that are mapped to the first unicast link 23 all satisfy the preset QoS condition, data duplication function of SLRB 1 and SLRB 2 is activated; and in a case that the data flow 4, the data flow 5, and the data flow 6 that are mapped to the second unicast link 24 all satisfy the preset QoS condition, data duplication function of SLRB 3 is activated. Other cases can be derived by analogy.

In another embodiment, the control granularity of SLRB data duplication function is terminal device level (per UE granularity), and the controlling data duplication function of the SLRB between the first terminal device and the second terminal device based on the preset rule and a control granularity of SLRB data duplication function includes:

in a case that all received data flows satisfy the preset QoS condition, activating data duplication function of all SLRBs between the first terminal device and the second terminal device.

For example, as shown in FIG. 2, in a case that the data flow 1, the data flow 2, the data flow 3, the data flow 4, the data flow 5, and the data flow 6 all satisfy the preset QoS condition, data duplication function of SLRB 1, SLRB 2, and SLRB3 is activated. Other cases can be derived by analogy.

In any one of the foregoing embodiments, the controlling data duplication function of the SLRB between the first terminal device and the second terminal device based on the preset rule and a control granularity of data duplication function may further include:

in a case that a condition for activating the SLRB under a corresponding control granularity is no longer satisfied, deactivating data duplication function of the SLRB.

The condition for activating the SLRB under a corresponding control granularity is caused to be no longer satisfied because of at least one of the following reasons: reception of a preset QoS condition reconfigured by the network device, reception of a new data flow from higher layers, or the like.

In other words, if the network device has reconfigured the preset QoS condition, and/or a new data flow (QoS flow) from higher layers (that is, the application layer and the V2X layer) has arrived, the condition for activating the SLRBs that are activated in the foregoing four embodiments is no longer satisfied, and data duplication function of these SLRBs is deactivated.

It can be understood that the foregoing first example proposes a per-flow data duplication function solution. In addition, while data duplication function of the SLRB between the first terminal device and the second terminal device is controlled, at least one of these factors can also be taken into account in addition to the reliability requirement of a data flow: latency requirement of the data flow, maximum data burst volume of the data flow, priority of the data flow, PFI value of the data flow, and PQI value of the data flow, rather than simply reusing the LTE solution. This can ensure more stable data transmission after data duplication function of an SLRB is activated, thereby achieving a purpose of improving service reliability.

Second Example

The preset rule includes whether at least one communication link between the first terminal device and the second terminal device satisfies a preset link condition.

Optionally, in the second example, before step 102, the method shown in FIG. 1 may further include:

receiving the preset link condition configured by a network device; or preconfiguring the preset link condition.

In other words, in this embodiment of this disclosure, the preset link condition may be preconfigured by a network device or may be preconfigured by the first terminal device itself.

On this basis, the controlling, based on a preset rule, data duplication function of an SLRB between the first terminal device and the second terminal device includes: in a case that a target communication link satisfies the preset link condition, activating data duplication function of all SLRBs on the target communication link, where the target communication link includes one or more communication links between the first terminal device and the second terminal device.

For example, as shown in FIG. 2, in a case that the first unicast link 23 satisfies the preset link condition, data duplication function of SLRB 1 and SLRB 2 on the first unicast link 23 is activated; and in a case that the second unicast link 24 satisfies the preset link condition, data duplication function of SLRB 3 on the second unicast link 24 is activated. Other cases can be derived by analogy.

Optionally, the controlling, based on a preset rule, data duplication function of an SLRB between the first terminal device and the second terminal device may further include:

in a case that the target communication link does not satisfy the preset link condition, deactivating data duplication function of all the SLRBs on the target communication link.

For example, as shown in FIG. 2, in a case that the first unicast link 23 does not satisfy the preset link condition, data duplication function of SLRB 1 and SLRB 2 on the first unicast link 23 is deactivated; and in a case that the second unicast link 24 does not satisfy the preset link condition, data duplication function of SLRB 3 on the second unicast link 24 is deactivated. Other cases can be derived by analogy.

It can be understood that the foregoing second example also proposes a per-flow data duplication function solution. In addition, while data duplication function of the SLRB between the first terminal device and the second terminal device is controlled, impact of a link state between the first terminal device and the second terminal device is taken into account. This can ensure more stable data transmission after data duplication function of an SLRB is activated, thereby achieving a purpose of improving service reliability.

Third Example

The preset rule includes whether at least one of the data flows satisfies the preset quality of service QoS condition, and whether at least one sidelink between the first terminal device and the second terminal device satisfies a preset link condition. Accordingly, the controlling, based on a preset rule, data duplication function of an SLRB between the first terminal device and the second terminal device in step 102 includes:

controlling data duplication function of the SLRB between the first terminal device and the second terminal device based on the preset rule and a control granularity of SLRB data duplication function, where the control granularity is one of flow level, SLRB level, link level, and terminal device level.

Optionally, in the third example, before step 102, the method shown in FIG. 1 may further include:

receiving the preset QoS condition and the preset link condition that are configured by a network device; or preconfiguring the preset QoS condition and the preset link condition.

In other words, in this embodiment of this disclosure, the preset QoS condition and the preset link condition may be preconfigured by a network device or may be preconfigured by the first terminal device itself.

On this basis, the foregoing step of controlling data duplication function between the first terminal device and the second terminal device based on the preset rule and a control granularity of SLRB data duplication function at least may include the following four embodiments. The following describes these embodiments with reference to FIG. 2.

In an embodiment, the control granularity of SLRB data duplication function is flow level (per flow granularity), and the controlling data duplication function of the SLRB between the first terminal device and the second terminal device based on the preset rule and a control granularity of SLRB data duplication function includes:

determining a target communication link on which a target SLRB resides, where the target SLRB includes one or more SLRBs between the first terminal device and the second terminal device, and the target communication link is a communication link between the first terminal device and the second terminal device; and in a case that at least one of data flows mapped to the target SLRB satisfies the preset QoS condition and the target communication link satisfies the preset link condition, activating data duplication function of the target SLRB.

For example, as shown in FIG. 2, a target communication link on which SLRB 1 resides is the first unicast link 23. Then in a case that the data flow 1 mapped to SLRB 1 satisfies the preset QoS condition and the first unicast link 23 satisfies the preset link condition, data duplication function of SLRB 1 is activated. A target communication link on which SLRB 2 resides is the first unicast link 23. Then in a case that at least one of the data flow 2 or the data flow 3 that are mapped to SLRB 1 satisfies the preset QoS condition and the first unicast link 23 satisfies the preset link condition, data duplication function of SLRB 2 is activated. A target communication link on which SLRB 3 resides is the second unicast link 24. Then in a case that at least one of the data flow 4, the data flow 5, or the data flow 6 that are mapped to SLRB 3 satisfies the preset QoS condition and the second unicast link 24 satisfies the preset link condition, data duplication function of SLRB 3 is activated. Other cases can be derived by analogy.

In another embodiment, the control granularity of SLRB data duplication function is SLRB level, and the controlling data duplication function of the SLRB between the first terminal device and the second terminal device based on the preset rule and a control granularity of SLRB data duplication function includes:

determining a target communication link on which a target SLRB resides, where the target SLRB includes one or more SLRBs between the first terminal device and the second terminal device, and the target communication link is a communication link between the first terminal device and the second terminal device; and in a case that all of data flows mapped to the target SLRB satisfy the preset QoS condition and the target communication link satisfies the preset link condition, activating data duplication function of the target SLRB.

For example, as shown in FIG. 2, a target communication link on which SLRB 1 resides is the first unicast link 23. Then in a case that the data flow 1 mapped to SLRB 1 satisfies the preset QoS condition and the first unicast link 23 satisfies the preset link condition, data duplication function of SLRB 1 is activated. A target communication link on which SLRB 2 resides is the first unicast link 23. Then in a case that the data flow 2 and the data flow 3 that are mapped to SLRB 1 both satisfy the preset QoS condition and the first unicast link 23 satisfies the preset link condition, data duplication function of SLRB 2 is activated. A target communication link on which SLRB 3 resides is the second unicast link 24. Then in a case that the data flow 4, the data flow 5, and the data flow 6 that are mapped to SLRB 3 all satisfy the preset QoS condition and the second unicast link 24 satisfies the preset link condition, data duplication function of SLRB 3 is activated. Other cases can be derived by analogy.

In another embodiment, the control granularity of SLRB data duplication function is link level, and the controlling data duplication function of the SLRB between the first terminal device and the second terminal device based on the preset rule and a control granularity of SLRB data duplication function includes:

determining a target communication link on which a target SLRB resides, where the target SLRB includes one or more SLRBs between the first terminal device and the second terminal device, and the target communication link is a communication link between the first terminal device and the second terminal device; and in a case that all of data flows mapped to the target communication link satisfy the preset QoS condition and the target communication link satisfies the preset link condition, activating data duplication function of all SLRBs on the target communication link.

For example, as shown in FIG. 2, a target communication link on which SLRB 1 resides is the first unicast link 23. Then in a case that the data flow 1, the data flow 2, and the data flow 3 that are mapped to the first unicast link 23 all satisfy the preset QoS condition and the first unicast link 23 satisfies the preset link condition, data duplication function of SLRB 1 and SLRB 2 is activated. A target communication link on which SLRB 3 resides is the second unicast link 24. Then in a case that the data flow 4, the data flow 5, and the data flow 6 that are mapped to the second unicast link 24 all satisfy the preset QoS condition and the second unicast link 24 satisfies the preset link condition, data duplication function of SLRB 3 is activated. Other cases can be derived by analogy.

In another embodiment, the control granularity of SLRB data duplication function is terminal device level, and the controlling data duplication function of the SLRB between the first terminal device and the second terminal device based on the preset rule and a control granularity of SLRB data duplication function includes:

determining all communication links between the first terminal device and the second terminal device; and in a case that all received data flows satisfy the preset QoS condition and all the target communication links satisfy the preset link condition, activating data duplication function of all SLRBs between the first terminal device and the second terminal device.

For example, as shown in FIG. 2, all communication links between the first terminal device 21 and the second terminal device 22 include the first unicast link 23 and the second unicast link 24. Then in a case that the data flow 1, the data flow 2, the data flow 3, the data flow 4, the data flow 5, and the data flow 6 all satisfy the preset QoS condition, and the first unicast link 23 and the second unicast link 24 both satisfy the preset link condition, data duplication function of SLRB 1, SLRB 2, and SLRB 3 is activated. Other cases can be derived by analogy.

Optionally, in any one of the foregoing embodiments, the controlling data duplication function of the SLRB between the first terminal device and the second terminal device based on the preset rule and a control granularity of data duplication function further includes:

in a case that a condition for activating the SLRB under a corresponding control granularity is no longer satisfied, deactivating data duplication function of the SLRB.

The condition for activating the SLRB under a corresponding control granularity is caused to be no longer satisfied because of at least one of the following reasons: reception of at least one of a preset QoS condition and a preset link condition that are reconfigured by the network device, reception of a new data flow from higher layers, or the like.

In other words, if the network device has reconfigured the preset QoS condition and/or the preset link condition, and/or a new data flow (QoS flow) from higher layers (that is, the application layer and the V2X layer) has arrived, the condition for activating the SLRBs that are activated in the foregoing four embodiments is no longer satisfied, and data duplication function of these SLRBs is deactivated.

It can be understood that the foregoing third example also proposes a per-flow data duplication function solution. In addition, in one aspect, while data duplication function of the SLRB between the first terminal device and the second terminal device is controlled, in addition to consideration of whether a data flow satisfies the preset QoS condition, whether at least one communication link between the first terminal device and the second terminal device satisfies the preset link condition is also considered. That is, both a QoS factor on the service layer and a link state of the sidelink are considered. This can ensure more stable data transmission after data duplication function of an SLRB is activated, thereby achieving a purpose of improving service reliability. In another aspect, while whether a data flow satisfies the preset QoS condition is considered, at least one of these factors can also be taken into account in addition to the reliability requirement of the data flow: latency requirement of the data flow, maximum data burst volume of the data flow, priority of the data flow, PC5 QoS flow identifier value PFI value of the data flow, and PC5 QoS identifier value PQI value of the data flow, rather than simply reusing the LTE solution. This can ensure more stable data transmission after data duplication function of an SLRB is activated, thereby achieving a purpose of improving service reliability.

In summary, the method for sidelink data duplication function control according to this embodiment of this disclosure can provide a per-flow data duplication function solution, which ensures more stable data transmission after data duplication function of an SLRB is activated, thereby achieving a purpose of improving service reliability.

The foregoing describes a method for sidelink data duplication function control according to an embodiment of this disclosure. The following introduces a method for information configuration according to an embodiment of this disclosure with reference to FIG. 3.

As shown in FIG. 3, the method for information configuration according to this embodiment of this disclosure may be applied to a network device. The method may include step 301.

In step 301, target information is transmitted to a first terminal device, where
- the target information is used for configuring a target condition for the first terminal device, the target condition includes at least one of a preset QoS condition or a preset link condition, and the target condition is used for the first terminal device to control data duplication function of a SLRB between the first terminal device and a second terminal device.

Optionally, the preset QoS condition includes at least one of the following conditions:
- a reliability requirement of a data flow being higher than a first preset threshold;
- a latency requirement of a data flow being lower than a second preset threshold;
- a maximum data burst volume of a data flow being higher than a third preset threshold;
- a priority of a data flow being higher than a fourth preset threshold;
- a PFI value of a data flow being in a preset PFI list; or
- a PQI value of a data flow being in a preset PQI list.

Optionally, the preset link condition includes at least one of the following conditions:
- a RSRP being higher than a fifth preset threshold; or
- no RLF being detected.

As for how the first terminal device controls data duplication function of a SLRB between the first terminal device and the second terminal device based on at least one of the preset QoS condition or the preset link condition, refer to the above description of the embodiment shown in FIG. 1. Details are not described herein again.

In the method for information configuration according to this embodiment of this disclosure, the preset QoS condition and/or the preset link condition for controlling data duplication function of the SLRB between the first terminal device and the second terminal device can be configured for the first terminal device. This helps the first terminal device control SLRB data duplication function on a per-flow basis and ensures more stable data transmission after data duplication function of an SLRB is activated, thereby achieving a purpose of improving service reliability.

Now that the foregoing has described the method for information configuration applied to a network device, the following describes the terminal device and the network device in the embodiments of this disclosure in detail with reference to FIG. 4 to FIG. 5.

FIG. 4 is a schematic structural diagram of a first terminal device 400 according to an embodiment of this disclosure. As shown in FIG. 4, the first terminal device 400 may include a first receiving module 401 and a control module 402.

The first receiving module 401 is configured to receive, from a higher layer, one or more data flows to be sent to a second terminal device.

The second terminal device is one or more terminal devices other than the first terminal device 400.

The control module 402 is configured to control, based on a preset rule, data duplication function of a SLRB between the first terminal device and the second terminal device, where the preset rule includes whether at least one of the data flows satisfies a preset QoS condition, and/or whether at least one communication link between the first terminal device and the second terminal device satisfies a preset link condition.

The at least one communication link between the first terminal device and the second terminal device includes at least one of a unicast link, a multicast link, or a broadcast link.

In this embodiment of this application, the preset QoS condition may include but is not limited to at least one of the following conditions:
- a reliability requirement of a data flow being higher than a first preset threshold;
- a latency requirement of a data flow being lower than a second preset threshold;
- a maximum data burst volume of a data flow being higher than a third preset threshold;
- a priority of a data flow being higher than a fourth preset threshold;
- a PFI value of a data flow being in a preset PFI list; or a PQI value of a data flow being in a preset PQI list.

In this embodiment of this application, the preset link condition includes but is not limited to at least one of the following conditions:

a RSRP being higher than a fifth preset threshold; or no RLF being detected.

The following describes in detail, by using several examples, the process of controlling data duplication function of the SLRB between the first terminal device and the second terminal device by the control module 402.

First Example

The preset rule includes whether at least one of the data flows satisfies the preset QoS condition, and the control module 402 may be configured to:

control data duplication function between the first terminal device and the second terminal device based on the preset rule and a control granularity of SLRB data duplication function, where the control granularity is one of flow level (per flow granularity), SLRB level (per SLRB granularity), link level (per link granularity), and terminal device level (per UE granularity).

Optionally, in the first example, the first terminal device 400 shown in FIG. 4 may further include a first receiving module or a first preconfiguration module.

The first receiving module is configured to receive the preset QoS condition configured by the network device.

The first preconfiguration module is configured to preconfigure the preset QoS condition.

On this basis, the process of controlling data duplication function between the first terminal device and the second terminal device by the control module 402 based on the preset rule and a control granularity of SLRB data duplication function at least may include the following four embodiments.

In an embodiment, the control granularity of SLRB data duplication function is flow level (per flow granularity), and the control module 402 may be configured to:

in a case that at least one of data flows mapped to a target SLRB satisfies the preset QoS condition, activate data duplication function of the target SLRB, where the target SLRB includes one or more SLRBs between the first terminal device and the second terminal device.

In another embodiment, the control granularity of SLRB data duplication function is SLRB level (per SLRB granularity), and the control module 402 may be configured to: in a case that all of data flows mapped to a target SLRB satisfy the preset QoS condition, activate data duplication function of the target SLRB, where the target SLRB includes one or more SLRBs between the first terminal device and the second terminal device.

In another embodiment, the control granularity of SLRB data duplication function is link level (per link granularity), and the control module 402 may be configured to:

in a case that all of data flows mapped to a target communication link satisfy the preset QoS condition, activate data duplication function of all SLRBs on the target communication link, where the target communication link includes one or more communication links between the first terminal device and the second terminal device.

In another embodiment, the control granularity of SLRB data duplication function is terminal device level, and the control module 402 may be configured to:

in a case that all received data flows satisfy the preset QoS condition, activate data duplication function of all SLRBs between the first terminal device and the second terminal device.

Optionally, in any one of the foregoing embodiments, the control module 402 may be further configured to:

in a case that a condition for activating the SLRB under a corresponding control granularity is no longer satisfied, deactivate data duplication function of the SLRB.

The condition for activating the SLRB under a corresponding control granularity is caused to be no longer satisfied because of at least one of the following reasons: reception of a preset QoS condition reconfigured by the network device, reception of a new data flow from higher layers, or the like.

It can be understood that the foregoing first example proposes a per-flow data duplication function solution. In addition, while data duplication function of the SLRB between the first terminal device and the second terminal device is controlled, at least one of these factors can also be taken into account in addition to the reliability requirement of a data flow: latency requirement of the data flow, maximum data burst volume of the data flow, priority of the data flow, PFI value of the data flow, or PQI value of the data flow, rather than simply reusing the LTE solution. This can ensure more stable data transmission after data duplication function of an SLRB is activated, thereby achieving a purpose of improving service reliability.

Second Example

The preset rule includes whether at least one communication link between the first terminal device and the second terminal device satisfies a preset link condition.

Optionally, in the second example, the first terminal device 400 shown in FIG. 4 may further include a second receiving module or a second preconfiguration module.

The second receiving module is configured to receive the preset link condition configured by the network device.

The second preconfiguration module is configured to preconfigure the preset link condition.

On this basis, the control module 402 may be configured to: in a case that a target communication link satisfies the preset link condition, activate data duplication function of all SLRBs on the target communication link, where the target communication link includes one or more communication links between the first terminal device and the second terminal device.

Optionally, the control module 402 may be further configured to: in a case that the target communication link does not satisfy the preset link condition, deactivate data duplication function of all the SLRBs on the target communication link.

It can be understood that the foregoing second example also proposes a per-flow data duplication function solution. In addition, while data duplication function of the SLRB between the first terminal device and the second terminal device is controlled, impact of a link state between the first terminal device and the second terminal device is taken into account. This can ensure more stable data transmission after data duplication function of an SLRB is activated, thereby achieving a purpose of improving service reliability.

Third Example

The preset rule includes whether at least one of the data flows satisfies the preset QoS condition, and whether at least one sidelink between the first terminal device and the second terminal device satisfies a preset link condition. Accordingly, the control module 402 may be configured to:

control data duplication function of the SLRB between the first terminal device and the second terminal device based on the preset rule and a control granularity of SLRB data duplication function, where the control granularity is one of flow level, SLRB level, link level, and terminal device level.

Optionally, in the third example, the first terminal device 400 shown in FIG. 4 may further include a third receiving module or a third preconfiguration module.

The third receiving module is configured to receive the preset QoS condition and the preset link condition that are configured by the network device.

The third preconfiguration module is configured to preconfigure the preset QoS condition and the preset link condition.

On this basis, the process of controlling data duplication function between the first terminal device and the second terminal device by the control module 402 based on the preset rule and a control granularity of SLRB data duplication function at least may include the following four embodiments.

In an embodiment, the control granularity of SLRB data duplication function is flow level (per flow granularity), and the control module 402 may be configured to:

determine a target communication link on which a target SLRB resides, where the target SLRB includes one or more SLRBs between the first terminal device and the second terminal device, and the target communication link is a communication link between the first terminal device and the second terminal device; and in a case that at least one of data flows mapped to the target SLRB satisfies the preset QoS condition and the target communication link satisfies the preset link condition, activate data duplication function of the target SLRB.

In another embodiment, the control granularity of SLRB data duplication function is SLRB level, and the control module 402 may be configured to:

determine a target communication link on which a target SLRB resides, where the target SLRB includes one or more SLRBs between the first terminal device and the second terminal device, and the target communication link is a communication link between the first terminal device and the second terminal device; and in a case that all of data flows mapped to the target SLRB satisfy the preset QoS condition and the target communication link satisfies the preset link condition, activate data duplication function of the target SLRB.

In another embodiment, the control granularity of SLRB data duplication function is link level, and the control module 402 may be configured to:

determine a target communication link on which a target SLRB resides, where the target SLRB includes one or more SLRBs between the first terminal device and the second terminal device, and the target communication link is a communication link between the first terminal device and the second terminal device; and in a case that all of data flows mapped to the target communication link satisfy the preset QoS condition and the target communication link satisfies the preset link condition, activate data duplication function of all SLRBs on the target communication link.

In another embodiment, the control granularity of SLRB data duplication function is terminal device level, and the control module 402 may be configured to:

determine all communication links between the first terminal device and the second terminal device; and in a case that all received data flows satisfy the preset QoS condition and all the target communication links satisfy the preset link condition, activate data duplication function of all SLRBs between the first terminal device and the second terminal device.

It can be understood that the foregoing third example also proposes a per-flow data duplication function solution. In addition, in one aspect, while data duplication function of the SLRB between the first terminal device and the second terminal device is controlled, in addition to consideration of whether a data flow satisfies the preset QoS condition, whether at least one communication link between the first terminal device and the second terminal device satisfies the preset link condition is also considered. That is, both a QoS factor on the service layer and a link state of the sidelink are considered. This can ensure more stable data transmission after data duplication function of an SLRB is activated, thereby achieving a purpose of improving service reliability. In another aspect, while whether a data flow satisfies the preset QoS condition is considered, at least one of these factors can also be taken into account in addition to the reliability requirement of the data flow: latency requirement of the data flow, maximum data burst volume of the data flow, priority of the data flow, PFI value of the data flow, or PQI value of the data flow, rather than simply reusing the LTE solution. This can ensure more stable data transmission after data duplication function of an SLRB is activated, thereby achieving a purpose of improving service reliability.

In summary, the first terminal device 400 according to this embodiment of this disclosure can provide a per-flow data duplication function solution, which ensures more stable data transmission after data duplication function of an SLRB is activated, thereby achieving a purpose of improving service reliability.

The first terminal device 400 shown in FIG. 4 may be configured to implement various embodiments of the method for sidelink data duplication function control shown in FIG. 1. For related details, refer to the foregoing method embodiments.

FIG. 5 is a schematic structural diagram of a network device 500 according to an embodiment of this disclosure. As shown in FIG. 5, the network device 500 may include a transmitting module 501.

The transmitting module 501 is configured to transmit target information to a first terminal device, where the target information is used for configuring a target condition for the first terminal device, the target condition includes at least one of a preset QoS condition or a preset link condition, and the target condition is used for the first terminal device to control data duplication function of a SLRB between the first terminal device and a second terminal device.

Optionally, the preset QoS condition includes at least one of the following conditions:

a reliability requirement of a data flow being higher than a first preset threshold;

a latency requirement of a data flow being lower than a second preset threshold;

a maximum data burst volume of a data flow being higher than a third preset threshold;

a priority of a data flow being higher than a fourth preset threshold;

a PFI value of a data flow being in a preset PFI list; or a PQI value of a data flow being in a preset PQI list.

Optionally, the preset link condition includes at least one of the following conditions:

a RSRP being higher than a fifth preset threshold; or no RLF being detected.

As for how the first terminal device controls data duplication function of a SLRB between the first terminal device and the second terminal device based on at least one of the preset QoS condition or the preset link condition, refer to the above description of the embodiment shown in FIG. 1. Details are not described herein again.

The network device 500 according to this embodiment of this disclosure can configure, for the first terminal device, the preset QoS and/or the preset link condition for controlling data duplication function of the sidelink radio bearer SLRB between the first terminal device and the second terminal device. This helps the first terminal device control SLRB data duplication function on a per-flow basis and ensures more stable data transmission after data duplication function of an SLRB is activated, thereby achieving a purpose of improving service reliability.

The network device 500 shown in FIG. 5 may be configured to implement various embodiments of the method for information configuration shown in FIG. 3. For related details, refer to the foregoing method embodiments.

Figure 6:
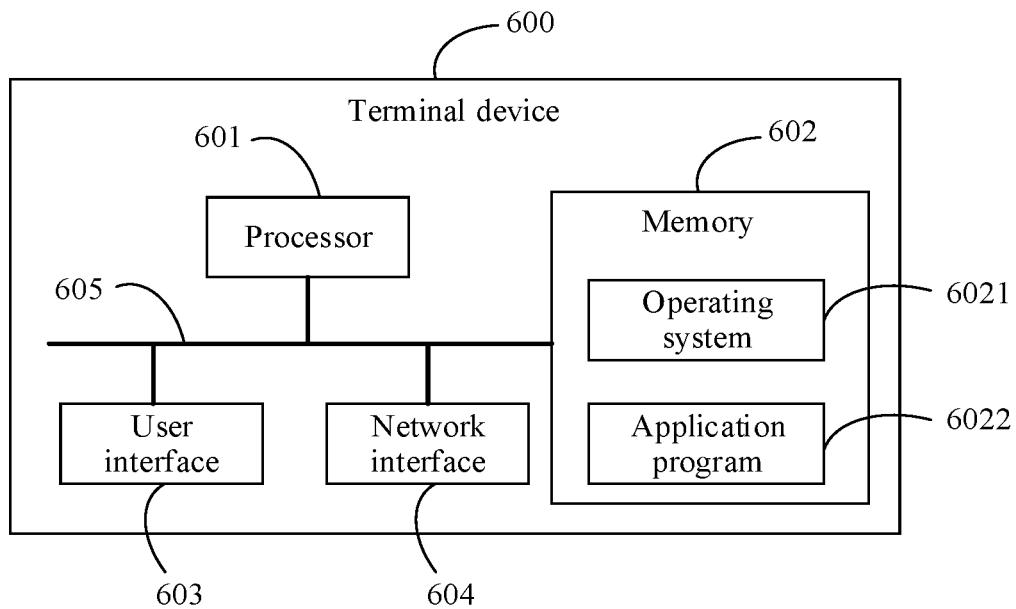
FIG. 6 is a schematic structural diagram of a terminal device 600 according to an embodiment of this disclosure.

FIG. 6 is a schematic structural diagram of a terminal device according to another embodiment of this disclosure. The terminal device 600 shown in FIG. 6 includes at least one processor 601, a memory 602, at least one network interface 604, and a user interface 603. The components in the terminal device 600 are coupled together through a bus system 605. It can be understood that the bus system 605 is configured to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, a pointing device (for example, a mouse or a trackball), a touch panel, or a touchscreen.

It can be understood that the memory 602 in this embodiment of this disclosure may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), and an electrically erasable programmable read-only memory (EEPROM), or a flash memory. The volatile memory may be a random access memory (RAM), which is used as an external cache. By way of example but not restrictive description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchronous link dynamic random access memory (SLDRAM), and a direct rambus random access memory (DRRAM). The memory 602 of the system and the method described in the embodiments of this disclosure is intended to include without being limited to these and any other applicable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player and a browser, which are used to implement various application services. A program for implementing the method in the embodiments of this disclosure may be included in the application program 6022.

In this embodiment of this disclosure, the terminal device 600 further includes: a computer program stored in the memory 602 and executable on the processor 601. When the computer program is executed by the processor 601, the processes of the method for sidelink data duplication function control described above are implemented, with the same technical effects achieved. To avoid repetition, details are not described herein again.

The method disclosed in the foregoing embodiments of this disclosure may be applied to the processor 601 or implemented by the processor 601. The processor 601 may be an integrated circuit chip that has a signal processing capability. During implementation, the steps of the foregoing method may be completed by hardware integrated logic circuits in the processor 601 or instructions in the form of software. The processor 601 may be a general-purpose processor, a digital signal processor (DSP), an application-specific integrated circuit (ASIC), a field programmable gate array (FPGA) or other programmable logic devices, a discrete gate or transistor logic device, or a discrete hardware component. The processor 601 may implement or execute the methods, steps, and logical block diagrams disclosed in the embodiments of this disclosure. The general-purpose processor may be a microprocessor, or the processor may be any conventional processor or the like. The steps of the methods disclosed with reference to the embodiments of this disclosure may be directly implemented by a hardware decoding processor, or may be implemented by a combination of hardware and software modules in a decoding processor. The software module may be located in a computer readable storage medium that is mature in the art, such as a random access memory, a flash memory, a read-only memory, a programmable read-only memory or electrically erasable programmable memory, or a register. The non-transitory computer-readable storage medium is located in the memory 602, and the processor 601 fetches information in the memory 602, and completes the steps of the foregoing method in combination with its hardware. Optionally, the non-transitory computer-readable storage medium stores a computer program, where when the computer program is executed by the processor 601, the steps in the embodiment of the method for sidelink data duplication function control described above are implemented.

Figure 7:
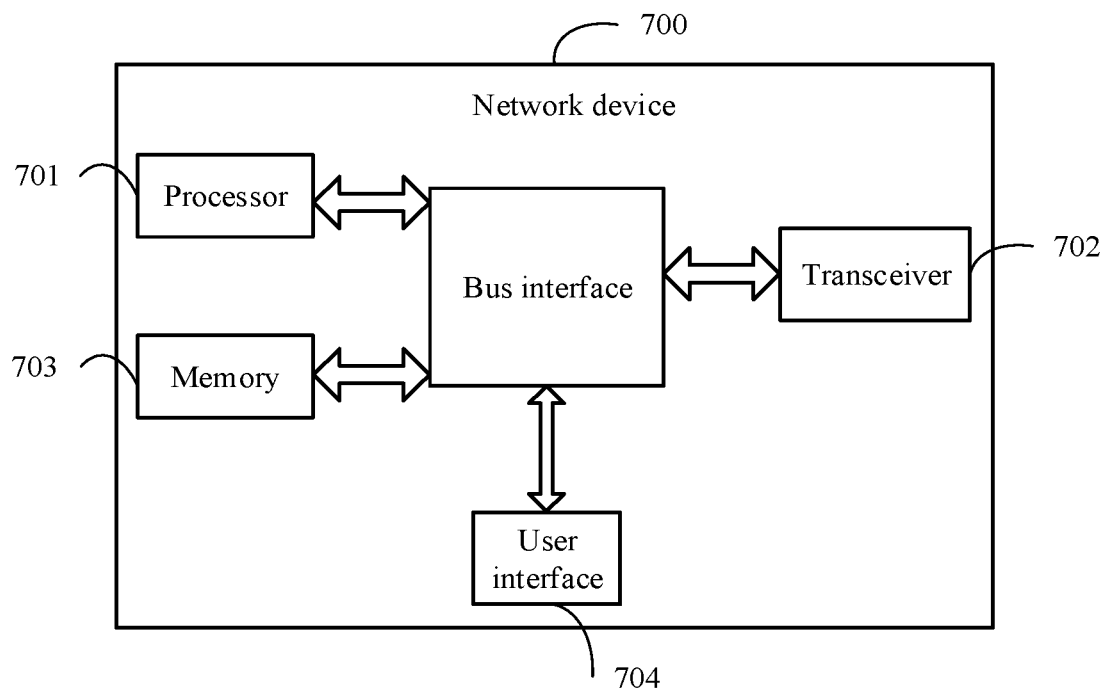
FIG. 7 is a schematic structural diagram of a network device 700 according to an embodiment of this disclosure.

Referring to FIG. 7, FIG. 7 is a structural diagram of a network device applied to an embodiment of this disclosure. The network device is capable of implementing details of the method for information configuration, with the same effects achieved. As shown in FIG. 7, the network device 700 includes a processor 701, a transceiver 702, a memory 703, a user interface 704, and a bus interface.

In this embodiment of this disclosure, the network device 700 further includes: a computer program that is stored in the memory 703 and executable on the processor 701, where when the computer program is executed by the processor 701, various processes of the method for information configuration described above are implemented, with the same technical effect achieved. Details are not described here again to avoid repetition.

In FIG. 7, a bus architecture may include any quantity of interconnect buses and bridges, for interconnecting various circuits of at least one processor represented by the processor 701 and a memory represented by the memory 703. The bus architecture may further interconnect various other circuits such as a peripheral device, a voltage regulator, and a power management circuit. These are all common sense in the art, and therefore are not further described in this specification. The bus interface provides interfaces. The transceiver 702 may be a plurality of components, that is, the transceiver 702 includes a transmitter and a receiver, and provides units for communicating with various other apparatuses on a transmission medium. For a different terminal device, the user interface 704 may also be an interface for externally or internally connecting a required device, and the connected device includes but is not limited to a mini keyboard, a display, a speaker, a microphone, a joystick, or the like.

The processor 701 is responsible for bus architecture management and general processing. The memory 703 may store data used when the processor 701 performs an operation.

It may be understood that the embodiments described in the embodiments of this disclosure may be implemented by hardware, software, firmware, middleware, microcode, or a combination thereof. In case of implementation by hardware, a processor 701 may be implemented in at least one application-specific integrated circuit (ASIC), digital signal processor (DSP), digital signal processing device (DSPD), programmable logic device (PLD), field programmable gate array (FPGA), general-purpose processor, controller, microcontroller, microprocessor, or other electronic units used to implement the functions described in this disclosure, or a combination thereof.

For software implementation, the technologies described in the embodiments of this disclosure may be implemented by modules (for example, processes or functions) that execute the functions described in the embodiments of this disclosure. Software code may be stored in the memory and executed by the processor. The memory may be implemented in or outside the processor.

An embodiment of this disclosure further provides a non-transitory computer-readable storage medium, where the non-transitory computer-readable storage medium stores a computer program. When the computer program is executed by a processor, the processes of the embodiments of the foregoing method for sidelink data duplication function control or the foregoing method for information configuration are implemented, with the same technical effects achieved. To avoid repetition, details are not described herein again. The non-transitory computer-readable storage medium includes a read-only memory (ROM), a random access memory (RAM), a magnetic disk, or an optical disc.

An embodiment of this disclosure further provides a computer program product including instructions. When the computer runs the instructions of the computer program product, the computer executes the foregoing method for sidelink data duplication function control or the foregoing method for information configuration. Optionally, the computer program product can be run on the foregoing network device.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this disclosure.

Flowcharts and block diagrams in the accompanying drawings illustrate the architecture, functionality, and operation of possible implementations of systems, methods, and computer program products according to various embodiments of this disclosure. In this aspect, each block in the flowcharts or the block diagrams may represent a module, a segment, or part of code, and the module, the segment, or the part of code includes one or more executable instructions used to realize (one or more) specified logical functions. It should also be noted that in some alternative implementations, the functions indicated in the blocks may alternatively occur in a different order than indicated in the drawings. For example, depending on the functions involved, two blocks shown in succession may actually be executed at substantially the same time, or the blocks may sometimes be executed in reverse order. It should be further noted that each block in the block diagrams and/or the flowcharts and a combination of the blocks in the block diagrams and/or the flowcharts may be implemented by a dedicated hardware-based system for executing a specified function or operation or may be implemented by a combination of dedicated hardware and computer instructions.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the several embodiments provided in this disclosure, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be indirect couplings or communications connections through some interfaces, apparatuses or units, and may be implemented in electrical, mechanical, or other forms.

The units described as separate parts may or may not be physically separate and parts displayed as units may or may not be physical units, meaning that they may be located in one position or distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as a separate product, the functions may be stored in a non-transitory computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes any medium that can store program code, such as a USB flash drive, a removable hard disk, a read-only memory (ROM), a random access memory (RAM), a magnetic disk, or an optical disc.

The foregoing descriptions are only specific implementations of this disclosure and are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for sidelink data duplication function control, applied to a first terminal device and comprising:
   receiving, from a higher layer, one or more data flows to be sent to a second terminal device; and
   controlling, based on a preset rule, data duplication function of a sidelink radio bearer (SLRB) between the first terminal device and the second terminal device, wherein the preset rule comprises whether at least one of data flows satisfies a preset quality of service (QOS) condition, and/or whether at least one communication link between the first terminal device and the second terminal device satisfies a preset link condition,
   wherein the preset rule comprises whether at least one of the data flows satisfies the preset QoS condition, and
   the controlling, based on the preset rule, data duplication function of the SLRB between the first terminal device and the second terminal device comprises:
   controlling data duplication function of the SLRB between the first terminal device and the second terminal device based on the preset rule and a control granularity of SLRB data duplication function, wherein the control granularity is one of flow level, SLRB level, link level, and terminal device level;
   wherein the control granularity is flow level, and
   the controlling data duplication function of the SLRB between the first terminal device and the second terminal device based on the preset rule and the control granularity of SLRB data duplication function comprises:
   in a case that at least one of data flows mapped to a target SLRB satisfies the preset QoS condition, activating data duplication function of the target SLRB, wherein the target SLRB includes one or more SLRBs between the first terminal device and the second terminal device; or
   the control granularity is SLRB level, and
   the controlling data duplication function of the SLRB between the first terminal device and the second terminal device based on the preset rule and the control granularity of SLRB data duplication function comprises:
   in a case that all of data flows mapped to a target SLRB satisfy the preset QoS condition, activating data duplication function of the target SLRB, wherein the target SLRB includes one or more SLRBs between the first terminal device and the second terminal device; or
   the control granularity is link level, and
   the controlling data duplication function of the SLRB between the first terminal device and the second terminal device based on the preset rule and the control granularity of SLRB data duplication function comprises:
   in a case that all of data flows mapped to a target communication link satisfy the preset QoS condition, activating data duplication function of all SLRBs on the target communication link, wherein the target communication link includes one or more communication links between the first terminal device and the second terminal device; or
   the control granularity is terminal device level, and
   the controlling data duplication function of the SLRB between the first terminal device and the second terminal device based on the preset rule and the control granularity of SLRB data duplication function comprises:
   in a case that all received data flows satisfy the preset QoS condition, activating data duplication function of all SLRBs between the first terminal device and the second terminal device.

2. The method according to claim 1, wherein
   before the controlling data duplication function of the SLRB between the first terminal device and the second terminal device based on the preset rule and the control granularity of SLRB data duplication function, the method further comprises:
   receiving the preset QoS condition configured by a network device; or
   preconfiguring the preset QoS condition.

3. The method according to claim 1, wherein
   the controlling data duplication function of the SLRB between the first terminal device and the second terminal device based on the preset rule and the control granularity of data duplication function further comprises:
   in a case that a condition for activating the SLRB under a corresponding control granularity is no longer satisfied, deactivating data duplication function of the SLRB.

4. The method according to claim 1, wherein
   the preset rule further comprises whether at least one sidelink between the first terminal device and the second terminal device satisfies the preset link condition.

5. The method according to claim 4, wherein
   before the controlling data duplication function of the SLRB between the first terminal device and the second terminal device based on the preset rule and the control granularity of SLRB data duplication function, the method further comprises:
   receiving the preset QoS condition and the preset link condition that are configured by a network device; or
   preconfiguring the preset QoS condition and the preset link condition.

6. The method according to claim 4, wherein
   the control granularity is flow level, and
   the controlling data duplication function of the SLRB between the first terminal device and the second terminal device based on the preset rule and the control granularity of SLRB data duplication function comprises:
   determining the target communication link on which a target SLRB resides, wherein the target SLRB includes one or more SLRBs between the first terminal device and the second terminal device; and in a case that at least one of data flows mapped to the target SLRB satisfies the preset QoS condition and the target communication link satisfies the preset link condition, activating data duplication function of the target SLRB; or the control granularity is SLRB level, and the controlling data duplication function of the SLRB between the first terminal device and the second terminal device based on the preset rule and the control granularity of SLRB data duplication function comprises:

determining the target communication link on which a target SLRB resides, wherein the target SLRB includes one or more SLRBs between the first terminal device and the second terminal device; and in a case that all of data flows mapped to the target SLRB satisfy the preset QoS condition and the target communication link satisfies the preset link condition, activating data duplication function of the target SLRB; or the control granularity is link level, and the controlling data duplication function of the SLRB between the first terminal device and the second terminal device based on the preset rule and the control granularity of SLRB data duplication function comprises:

determining the target communication link on which a target SLRB resides, wherein the target SLRB includes one or more SLRBs between the first terminal device and the second terminal device; and in a case that all of data flows mapped to the target communication link satisfy the preset QoS condition and the target communication link satisfies the preset link condition, activating data duplication function of all SLRBs on the target communication link; or the control granularity is terminal device level, and the controlling data duplication function of the SLRB between the first terminal device and the second terminal device based on the preset rule and the control granularity of SLRB data duplication function comprises:

determining all communication links between the first terminal device and the second terminal device; and in a case that all the received data flows satisfy the preset QoS condition and all the target communication links satisfy the preset link condition, activating data duplication function of all SLRBs between the first terminal device and the second terminal device.

7. The method according to claim 6, wherein the controlling data duplication function of the SLRB between the first terminal device and the second terminal device based on the preset rule and the control granularity of SLRB data duplication function further comprises:

in a case that a condition for activating the SLRB under a corresponding control granularity is no longer satisfied, deactivating data duplication function of the SLRB.

8. The method according to claim 1, wherein the preset QoS condition comprises at least one of:

a reliability requirement of a data flow being higher than a first preset threshold;

a latency requirement of a data flow being lower than a second preset threshold;

a maximum data burst volume of a data flow being higher than a third preset threshold;

a priority of a data flow being higher than a fourth preset threshold;

a PC5 QoS flow identifier value (PFI) value of a data flow being in a preset PFI list; or a PC5 QoS identifier value (PQI) value of a data flow being in a preset PQI list.

9. The method according to claim 1, wherein the preset link condition comprises at least one of:

a reference signal received power (RSRP) being higher than a fifth preset threshold; or no radio link failure (RLF) being detected.

10. A first terminal device, comprising a memory, a processor, and a wireless communication program stored in the memory and executable on the processor, wherein the wireless communication program, when executed by the processor, causes the first terminal device to perform:

receiving, from a higher layer, one or more data flows to be sent to a second terminal device; and controlling, based on a preset rule, data duplication function of a sidelink radio bearer (SLRB) between the first terminal device and the second terminal device, wherein the preset rule comprises whether at least one of data flows satisfies a preset quality of service (QOS) condition, and/or whether at least one communication link between the first terminal device and the second terminal device satisfies a preset link condition;

wherein the preset rule comprises whether at least one of the data flows satisfies the preset QoS condition, and the wireless communication program, when executed by the processor, causes the first terminal device to perform:

controlling data duplication function of the SLRB between the first terminal device and the second terminal device based on the preset rule and a control granularity of SLRB data duplication function, wherein the control granularity is one of flow level, SLRB level, link level, and terminal device level;

wherein the control granularity is flow level, and the wireless communication program, when executed by the processor, causes the first terminal device to perform:

in a case that at least one of data flows mapped to a target SLRB satisfies the preset QoS condition, activating data duplication function of the target SLRB, wherein the target SLRB includes one or more SLRBs between the first terminal device and the second terminal device; or the control granularity is SLRB level, and the wireless communication program, when executed by the processor, causes the first terminal device to perform:

in a case that all of data flows mapped to a target SLRB satisfy the preset QoS condition, activating data duplication function of the target SLRB, wherein the target SLRB includes one or more SLRBs between the first terminal device and the second terminal device; or the control granularity is link level, and the wireless communication program, when executed by the processor, causes the first terminal device to perform:

in a case that all of data flows mapped to a target communication link satisfy the preset QoS condition, activating data duplication function of all SLRBs on the target communication link, wherein the target communication link includes one or more communication links between the first terminal device and the second terminal device; or the control granularity is terminal device level, and the wireless communication program, when executed by the processor, causes the first terminal device to perform:
in a case that all received data flows satisfy the preset QoS condition, activating data duplication function of all SLRBs between the first terminal device and the second terminal device.

11. The first terminal device according to claim 10, wherein the wireless communication program, when executed by the processor, causes the first terminal device to further perform:
receiving the preset QoS condition configured by a network device; or
preconfiguring the preset QoS condition.

12. The first terminal device according to claim 10, wherein the wireless communication program, when executed by the processor, causes the first terminal device to further perform:
in a case that a condition for activating the SLRB under a corresponding control granularity is no longer satisfied, deactivating data duplication function of the SLRB.

13. The first terminal device according to claim 10, wherein the preset rule further comprises whether at least one sidelink between the first terminal device and the second terminal device satisfies the preset link condition.

14. The first terminal device according to claim 13, wherein the wireless communication program, when executed by the processor, causes the first terminal device to further perform:
receiving the preset QoS condition and the preset link condition that are configured by a network device; or
preconfiguring the preset QoS condition and the preset link condition.

15. The first terminal device according to claim 14, wherein
the control granularity is flow level, and the wireless communication program, when executed by the processor, causes the first terminal device to perform:
determining the target communication link on which a target SLRB resides, wherein the target SLRB includes one or more SLRBs between the first terminal device and the second terminal device; and
in a case that at least one of data flows mapped to the target SLRB satisfies the preset QoS condition and the target communication link satisfies the preset link condition, activating data duplication function of the target SLRB; or
the control granularity is SLRB level, and the wireless communication program, when executed by the processor, causes the first terminal device to perform:
determining the target communication link on which a target SLRB resides, wherein the target SLRB includes one or more SLRBs between the first terminal device and the second terminal device; and
in a case that all of data flows mapped to the target SLRB satisfy the preset QoS condition and the target communication link satisfies the preset link condition, activating data duplication function of the target SLRB; or
the control granularity is link level, and the wireless communication program, when executed by the processor, causes the first terminal device to perform:
determining the target communication link on which a target SLRB resides, wherein the target SLRB includes one or more SLRBs between the first terminal device and the second terminal device; and
in a case that all of data flows mapped to the target communication link satisfy the preset QoS condition and the target communication link satisfies the preset link condition, activating data duplication function of all SLRBs on the target communication link; or
the control granularity is terminal device level, and the wireless communication program, when executed by the processor, causes the first terminal device to perform:
determining all communication links between the first terminal device and the second terminal device; and
in a case that all the received data flows satisfy the preset QoS condition and all the target communication links satisfy the preset link condition, activating data duplication function of all SLRBs between the first terminal device and the second terminal device.

16. The first terminal device according to claim 15, wherein the wireless communication program, when executed by the processor, causes the first terminal device to further perform:
in a case that a condition for activating the SLRB under a corresponding control granularity is no longer satisfied, deactivating data duplication function of the SLRB.

17. The first terminal device according to claim 10, wherein
the preset QoS condition comprises at least one of:
a reliability requirement of a data flow being higher than a first preset threshold;
a latency requirement of a data flow being lower than a second preset threshold;
a maximum data burst volume of a data flow being higher than a third preset threshold;
a priority of a data flow being higher than a fourth preset threshold;
a PC5 QOS flow identifier value (PFI) value of a data flow being in a preset PFI list; or
a PC5 QoS identifier value (PQI) value of a data flow being in a preset PQI list.

18. The first terminal device according to claim 10, wherein
the preset link condition comprises at least one of:
a reference signal received power (RSRP) being higher than a fifth preset threshold; or
no radio link failure (RLF) being detected.

19. A non-transitory computer-readable storage medium, wherein a wireless communication program is stored in the non-transitory computer-readable storage medium, and the wireless communication program, when executed by a processor of a first terminal device, causes the first terminal device to perform:
receiving, from a higher layer, one or more data flows to be sent to a second terminal device; and
controlling, based on a preset rule, data duplication function of a sidelink radio bearer (SLRB) between the first terminal device and the second terminal device, wherein the preset rule comprises whether at least one of data flows satisfies a preset quality of service (QOS) condition, and/or whether at least one communication link between the first terminal device and the second terminal device satisfies a preset link condition;
wherein the preset rule comprises whether at least one of the data flows satisfies the preset QoS condition, and the wireless communication program, when executed by the processor, causes the first terminal device to perform:
controlling data duplication function of the SLRB between the first terminal device and the second terminal device based on the preset rule and a control granularity of SLRB data duplication function, wherein the control granularity is one of flow level, SLRB level, link level, and terminal device level;
wherein the control granularity is flow level, and the wireless communication program, when executed by the processor, causes the first terminal device to perform:
in a case that at least one of data flows mapped to a target SLRB satisfies the preset QoS condition, activating data duplication function of the target SLRB, wherein the target SLRB includes one or more SLRBs between the first terminal device and the second terminal device; or
the control granularity is SLRB level, and the wireless communication program, when executed by the processor, causes the first terminal device to perform:
in a case that all of data flows mapped to a target SLRB satisfy the preset QoS condition, activating data duplication function of the target SLRB, wherein the target SLRB includes one or more SLRBs between the first terminal device and the second terminal device; or
the control granularity is link level, and the wireless communication program, when executed by the processor, causes the first terminal device to perform:
in a case that all of data flows mapped to a target communication link satisfy the preset QoS condition, activating data duplication function of all SLRBs on the target communication link, wherein the target communication link includes one or more communication links between the first terminal device and the second terminal device; or
the control granularity is terminal device level, and the wireless communication program, when executed by the processor, causes the first terminal device to perform:
in a case that all received data flows satisfy the preset QoS condition, activating data duplication function of all SLRBs between the first terminal device and the second terminal device.

20. The non-transitory computer-readable storage medium according to claim 19, wherein the wireless communication program, when executed by the processor, causes the first terminal device to further perform:
receiving the preset QoS condition configured by a network device; or
preconfiguring the preset QoS condition.

\* \* \* \* \*